United States Patent
Sugiura et al.

(10) Patent No.: US 10,865,322 B2
(45) Date of Patent: Dec. 15, 2020

(54) OIL-BASED INKJET INK

(71) Applicant: RISO KAGAKU CORPORATION, Tokyo (JP)

(72) Inventors: Hikaru Sugiura, Ibaraki (JP); Shinichiro Shimura, Ibaraki (JP); Marie Morinaga, Ibaraki (JP); Kazuyuki Ando, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 295 days.

(21) Appl. No.: 15/904,508

(22) Filed: Feb. 26, 2018

(65) Prior Publication Data
US 2018/0244941 A1 Aug. 30, 2018

(30) Foreign Application Priority Data

Feb. 28, 2017 (JP) .................................. 2017-035942
Sep. 28, 2017 (JP) .................................. 2017-188383

(51) Int. Cl.
| C09D 11/36 | (2014.01) |
| C09D 11/326 | (2014.01) |
| C09D 11/322 | (2014.01) |
| C09D 11/033 | (2014.01) |
| C09D 11/037 | (2014.01) |

(52) U.S. Cl.
CPC ............ *C09D 11/36* (2013.01); *C09D 11/033* (2013.01); *C09D 11/037* (2013.01); *C09D 11/322* (2013.01); *C09D 11/326* (2013.01)

(58) Field of Classification Search
None
See application file for complete search history.

(56) References Cited

U.S. PATENT DOCUMENTS

| 4,338,133 | A | 7/1982 | Toyoda |
| 5,968,244 | A | 10/1999 | Ueda et al. |
| 5,980,624 | A | 11/1999 | Ichikawa et al. |
| 6,113,679 | A | 9/2000 | Adkins |
| 7,834,072 | B2 | 11/2010 | Carlini et al. |
| 8,038,784 | B2 | 10/2011 | Watanabe et al. |
| 8,440,010 | B2 | 5/2013 | Endo |
| 8,507,585 | B2 | 8/2013 | Hosoya et al. |
| 9,624,394 | B2 | 4/2017 | Endo et al. |
| 9,624,402 | B2 | 4/2017 | Shimura et al. |
| 9,821,568 | B2 | 11/2017 | Shimura |
| 9,845,402 | B2 | 12/2017 | Shimura et al. |
| 2003/0220418 | A1* | 11/2003 | Horie .................... C09D 11/36 523/160 |
| 2004/0063811 | A1 | 4/2004 | Horie et al. |
| 2004/0068031 | A1 | 4/2004 | Horie |
| 2004/0265756 | A1 | 12/2004 | Horie |
| 2005/0046675 | A1* | 3/2005 | Aoshima ............... C09D 11/36 347/55 |
| 2005/0119363 | A1 | 6/2005 | Yamada et al. |
| 2006/0189712 | A1 | 8/2006 | Kondo |
| 2007/0022904 | A1 | 2/2007 | Kitawaki et al. |
| 2008/0194754 | A1 | 8/2008 | Nakamura |
| 2009/0090271 | A1 | 4/2009 | Wynants et al. |
| 2009/0263632 | A1 | 10/2009 | Kojima et al. |
| 2010/0105807 | A1 | 4/2010 | Sugita et al. |
| 2010/0136234 | A1 | 6/2010 | Kobayashi |
| 2011/0232528 | A1 | 9/2011 | Endo et al. |
| 2012/0006225 | A1 | 1/2012 | Tsukiana et al. |
| 2012/0048141 | A1 | 3/2012 | Arai et al. |
| 2018/0244936 | A1 | 8/2018 | Shimura et al. |
| 2018/0244937 | A1 | 8/2018 | Sugiura et al. |
| 2018/0244938 | A1 | 8/2018 | Morinaga et al. |
| 2018/0244939 | A1 | 8/2018 | Sugiura et al. |
| 2018/0244940 | A1 | 8/2018 | Ando et al. |
| 2018/0327617 | A1 | 11/2018 | Inoue et al. |
| 2019/0100002 | A1 | 4/2019 | Ozawa |
| 2019/0100668 | A1 | 4/2019 | Ando |
| 2019/0100671 | A1 | 4/2019 | Morinaga |
| 2019/0134989 | A1 | 5/2019 | Matsumoto et al. |
| 2019/0300737 | A1 | 10/2019 | Ozawa |
| 2020/0040206 | A1 | 2/2020 | Sugiura |

FOREIGN PATENT DOCUMENTS

| AU | 2012247077 B2 | 11/2012 |
| CN | 1576322 A | 2/2005 |
| CN | 101027370 A | 8/2007 |
| CN | 101652437 A | 2/2010 |
| CN | 102199382 A | 9/2011 |
| CN | 104610811(A) | 5/2015 |
| CN | 106084984 A | 11/2016 |

(Continued)

OTHER PUBLICATIONS

European Search Report issued with respect to Application No. 18158552.2, dated May 17, 2018.
Official Communication issued in European Patent Office (EPO) Patent Application No. 18 158 557.1, dated Sep. 5, 2019.
English translation of JP 2006/307107, Nov. 2006; 28 pages.
English translation of JP 2016/196564, Nov. 2016; 29 pages.
English translation of JP 2001/098196, Apr. 2001; 12 pages.
English translation of JPH 03/292370, Dec. 1991; 6 pages.
Reactive and Non-Reactive Silicone Fluid from Shin-Etsu Chemical Co. Ltd., shinetsusilicone-global.com/catalog/pdf/modified_e.pdf; 2006; 10 pages.

(Continued)

Primary Examiner — Helene Klemanski
(74) Attorney, Agent, or Firm — Greenblum & Bernstein, P.L.C.

(57) ABSTRACT

An oil-based inkjet ink can be provided which exhibits excellent discharge stability even after a long idle period, and also yields high image density and prevents show-through in printed items. The oil-based inkjet ink contains a pigment, an amide-based dispersant and a non-aqueous solvent, wherein the non-aqueous solvent contains a modified silicone oil having 2 or 3 silicon atoms in one molecule, and a petroleum-based hydrocarbon solvent.

5 Claims, No Drawings

(56) References Cited

FOREIGN PATENT DOCUMENTS

| | | |
|---|---|---|
| EP | 1493783 A1 | 1/2005 |
| EP | 3093316 A1 | 11/2016 |
| EP | 3 366 737 | 8/2018 |
| EP | 3 366 739 | 8/2018 |
| EP | 3366733 | 8/2018 |
| EP | 3461868 | 4/2019 |
| JP | 01203482 A | 8/1989 |
| JP | H03-292370 A | 12/1991 |
| JP | H04-161467 A | 6/1992 |
| JP | H04-248879 A | 9/1992 |
| JP | 2001-098196 A | 4/2001 |
| JP | 2001-342388 | 12/2001 |
| JP | 2004-217703 A | 8/2004 |
| JP | 2005-60567 A | 3/2005 |
| JP | 2006-307107 A | 11/2006 |
| JP | 2006-315363 A | 11/2006 |
| JP | 2007-154149 A | 6/2007 |
| JP | 2010001452 | 1/2010 |
| JP | 2010/064478 | 3/2010 |
| JP | 2014-19766 A | 2/2014 |
| JP | 2016-196564 A | 11/2016 |

OTHER PUBLICATIONS

"Phenyl Methyl Silicon Fluid" www.organosilicon.com/en/68083-14-7.htm, no date available; 1 page.
Mar. 11, 2020 Office Action in copending U.S. Appl. No. 15/904,478, filed Feb. 26, 2018.
Office Action in U.S. Appl. No. 15/904,496 dated Sep. 21, 2018.
European Search Report issued with respect to Application No. 18158568.8, dated May 24, 2018.
European Search Report issued with respect to Application No. 18158557.1, dated May 24, 2018.
European Search Report issued with respect to Application No. 18158565.4, dated Jun. 1, 2018.
European Search Report issued with respect to Application No. 18158577.9, dated Jun. 21, 2018.
European Search Report issued with respect to Application No. 18158573.8, dated Jul. 18, 2018.
Jan. 11, 2019 Office Action in copending U.S. Appl. No. 15/904,496, filed Feb. 26, 2018.
English translation of JP-01203482-A, Aug. 1989; 6 pages.
Apr. 7, 2020 Office Action in copending U.S. Appl. No. 15/904,476, filed Feb. 26, 2018.
"Silicone Fluid KF-96" from Shin-Etsu Chemical Co., Ltd.; shinetsusilicone-global.com/catalog/pdf/kf96_e.pdf. 2004; 36 pages.
English translation of JP 2004/217703, Aug. 2004; 9 pages.
Apr. 9, 2020 Office Action in copending U.S. Appl. No. 15/904,481, filed Feb. 26, 2018.
Apr. 13, 2020 Office Action in copending U.S. Appl. No. 15/904,504, filed Feb. 26, 2018.
Apr. 15, 2020 Office Action in copending U.S. Appl. No. 16/141,054, filed Sep. 25, 2018.
Extended European Search Report from European Patent Office (EPO) in European Patent Appl. No. 18192237.8, dated Mar. 14, 2019.
English translation of JPH 04/248879, Sep. 1992; 13 pages.
Apr. 15, 2020 Office Action in copending U.S. Appl. No. 16/141,003, filed Sep. 25, 2018.
English translation of JP 2010/064478, Mar. 2010; 40 pages.
"Development of a Three-Dimensional Bioprinter: Construction of a Cell Supporting Structures Using Hydrogel and State-Of-The-Art Inkjet Technology" by Nishiyama et al.; J. Biomechanical Engineering, 131(3): 035001, Mar. 2009; 6 pages.
Catalogue of Organic Modified Silicone, Dow Corning Toray Co., Ltd., in Japanese, with English Translation of p. 10 (2016).
"Silicon Compounds: Silanes and Silicones," *GELEST, A Survey of Properties and Chemistry*, 3$^{rd}$ Edition, edited by Barry Arkles & Gerald L. Larson, Gelest, Inc. Morrisville, PA, 608 pages (2013).
Official Action dated Aug. 5, 2020 in the counterpart Chinese application No. 201810159232.X with translation.
Latest Practical Manual of Printing Technology, Letterpress Printing Technology Bulletin, Guangzhou, Tibet, page 119, Hefei: Anhui Audio-Visual Publishing House, Nov. 2003.
"Silicone Production and Application Technology", Institute of Scientific and Technological Information, Ministry of Chemical Industry, p. 86 Institute of Scientific and Technological Information, Ministry of Chemical Industry, Dec. 1985.
"Modern Fine Chemical Technology and Product Synthesis Processes", Kwong Shenglu, pp. 273-274, Beijing: Science and Technology Literature Publishing House, Dec. 1997.
Official Action dated Oct. 9, 2020 in the counterpart Chinese application No. 201810159076.7 (corresponding to U.S. Appl. No. 15/904,476).
Official Action dated Oct. 14, 2020 in the counterpart Chinese application No. 201810159427.4 (corresponding to U.S. Appl. No. 15/904,478) and its partial machine translation.
Official Action dated Oct. 14, 2020 in the counterpart Chinese application No. 201810161382.4 (corresponding to U.S. Appl. No. 15/904,481) and its partial machine translation.
"Industrial Plastics Dictionary", 1st edition, Su Jiaxai et al., p. 19, Chemical Industry Publishing Co., Ltd., release date: Dec. 31, 1989.
*Functional Polymer Materials* (2nd Edition), Royal Construction, pp. 311-334, Doje University Press, release date: June 30, 2014.
*Practical Manual For Cosmetics Raw Material Standards*, 1st edition, China Flavored Cosmetics Industry Association, pp. 71-73, China Standard Publishing, release date Mar. 31, 2002.
*Overview Of The Chemical Industry*, 1st edition, Peng Shishimatsu et al., pp. 280-282, Chemical Industry Publishing Company, release date: Jun. 30, 1989.
*Printing Material And Suitability*, 2nd Edition, Jiang Xuecheng et al., pp. 140-143, Tohoku Forestry University Press. Release Date: Aug. 31, 2016.
*Kako Encyclopedia* (The Eighth Volume), 1st edition, Chemical Encyclopedia Editorial Department, pp. 957-958, Chemical Industry Publishing Company, release date Sep. 30, 1994.

\* cited by examiner

OIL-BASED INKJET INK

CROSS REFERENCE TO RELATED APPLICATIONS

This Application is based upon and claims the benefit of priority from prior Japanese Patent Applications No. 2017-035942 filed on Feb. 28, 2017, the entire contents of which are incorporated by reference herein, and prior Japanese Patent Applications No. 2017-188383 filed on Sep. 28, 2017, the entire contents of which are incorporated by reference herein.

BACKGROUND OF THE INVENTION

Field of the Invention

The present invention relates to an oil-based inkjet ink.

Description of the Related Art

The inkjet recording method is a method in which an inkjet ink of high fluidity is jetted from fine nozzles in the form of liquid droplets, thereby recording an image on a recording medium positioned facing the nozzles, and because this method enables high-speed printing to be conducted with little noise, it has rapidly become widespread in recent years. Examples of known types of inks that can be used in this type of inkjet recording method include aqueous inks which contain water as the main solvent, ultraviolet-curable inks (UV inks) which contain a large amount of a polymerizable monomer as the main component, hot melt inks (solid inks) which contain a large amount of a wax as the main component, and so-called non-aqueous inks which contain a non-aqueous solvent as the main solvent. Non-aqueous inks can be classified into solvent-based inks in which the main solvent is a volatile organic solvent, and oil-based inks in which the main solvent is an organic solvent having either low volatility or no volatility. Solvent-based inks mainly dry on the recording medium as a result of evaporation of the organic solvent, whereas oil-based inks mainly dry as a result of penetration into the recording medium.

Patent Document 1 (JP 2004-217703 A) proposes that by using an inkjet non-aqueous pigment ink containing a silicone-based solvent, a pigment, and a specific modified silicone oil as a dispersant, problems of ink stability, nozzle blockages and clear file deformation can be improved.

Patent Document 2 (JP H04-248879 A) proposes that by using an inkjet recording ink containing, at least, 2 to 95 wt % of a silicone-based solvent with a boiling point of 100° C. to 250° C., and a colorant that is insoluble in the solvent, good print quality can be obtained regardless of the paper quality, satisfactory rub fastness can be achieved several seconds after printing, and vivid images can be obtained with no color mixing in color images.

Patent Document 3 (JP 2016-196564 A) proposes that by using a non-aqueous inkjet ink composition containing a pigment, a non-aqueous solvent and a surfactant, wherein the surfactant contains a siloxane-based surfactant having an HLB value of at least 1.0 but not more than 7.0, the optical density of the image, and the discharge stability and storage stability of the ink can be improved.

Patent Document 4 (JP H04-161467 A) proposes that by using an inkjet printer ink that uses an insulating solvent having a siloxane linkage in the molecular skeleton, high-density vivid printing is possible, the printed image has favorable rub fastness, and stable discharge can be achieved.

SUMMARY OF THE INVENTION

One embodiment of the invention provides an oil-based inkjet ink containing a pigment, an amide-based dispersant and a non-aqueous solvent, wherein the non-aqueous solvent contains a modified silicone oil having 2 or 3 silicon atoms in one molecule, and a petroleum-based hydrocarbon solvent.

DETAILED DESCRIPTION OF THE EMBODIMENTS

The present invention is described below using embodiments. However, examples presented in the following embodiments in no way limit the present invention.

The silicone-based solvents proposed in Patent Documents 1 and 2 are mainly dimethyl silicones. Dimethyl silicones have a high affinity relative to the inkjet nozzle head. Accordingly, these inks that use a dimethyl silicone tend to adhere readily to the nozzle head, which can sometimes result in ink that has adhered to the nozzle head dripping onto the printed item, or ink solidifying in the vicinity of the nozzle head, causing nozzle discharge faults.

In Patent Document 3, the siloxane-based surfactant is added to improve the pigment dispersion stability, but because the surfactant must have sufficient hydrophilic group portions to facilitate adsorption to the pigment surface, it is not suited to the solvent.

In Patent Document 4, an insulating solvent having a siloxane linkage in the molecular skeleton is used, but no detailed description is provided as to what types of functional groups are bonded to the siloxane linkage of the solvent, or how many siloxane linkages exist in the solvent.

One object of the present invention is to provide an oil-based inkjet ink that exhibits excellent discharge stability even after a long idle period, and also yields high image density and prevents show-through in printed items.

The oil-based inkjet ink according to one embodiment (hereafter sometimes referred to as simply "the ink") contains a pigment, an amide-based dispersant and a non-aqueous solvent, wherein the non-aqueous solvent contains a modified silicone oil having 2 or 3 silicon atoms in one molecule, and a petroleum-based hydrocarbon solvent.

As a result, an oil-based inkjet ink can be provided that exhibits excellent discharge stability even after a long idle period, and yields high image density and prevents show-through in printed items.

By including an amide-based dispersant together with the pigment in the ink, the dispersion stability of the pigment is improved, and the image density of the printed items can be enhanced.

By including a petroleum-based hydrocarbon solvent together with the amide-based dispersant in the ink, because the amide-based dispersant is readily soluble in the petroleum-based hydrocarbon solvent, the amide-based dispersant is able to coat the pigment surface more uniformly, enabling the dispersion stability of the pigment to be further improved.

If only the petroleum-based hydrocarbon solvent is used, then ink volatilization from the nozzles becomes problematic, but by using a modified silicone oil in combination with the petroleum-based hydrocarbon solvent as the non-aqueous solvent, ink volatilization from the nozzles can be prevented, and the discharge performance, and particularly the discharge performance after a long idle period, can be improved.

By ensuring that the modified silicone oil has 2 or 3 silicon atoms, ink wetting of the nozzle plate can be reduced, and the ink can be prevented from adhering to the nozzle plate. Further, because the silicone oil is modified with organic groups, the structure differs from that of the material of the nozzle plate, and the surface tension also increases, thereby reducing the affinity of the silicone oil relative to the nozzle plate and preventing adhesion of the ink to the nozzle plate.

Moreover, when the ink is discharged onto a recording medium, the modified silicone oil in the ink tends to penetrate into the interior of the recording medium, whereas the petroleum-based hydrocarbon solvent in the ink tends to be retained at the recording medium surface. Because the amide-based dispersant dissolves more readily in the petroleum-based hydrocarbon solvent than the modified silicone oil, the pigment in the ink tends to exist in the petroleum-based hydrocarbon solvent together with the amide-based dispersant. Accordingly, the amide-based dispersant and the pigment are retained at the recording medium surface together with the petroleum-based hydrocarbon solvent, meaning show-through can be prevented in the printed items.

It is preferable to use a combination of a petroleum-based hydrocarbon solvent with a low initial boiling point and a modified silicone oil with a high boiling point. This enables the amide-based dispersant to dissolve in the petroleum-based hydrocarbon solvent, which has a low initial boiling point and a low aniline point, thereby improving the pigment dispersibility, but also enables the modified silicone oil to suppress the volatility of the overall ink, thereby improving the discharge performance. Further, when the ink is discharged onto a recording medium, the amide-based dispersant and the pigment can be more easily retained with the petroleum-based hydrocarbon solvent at the recording medium surface, meaning printed item show-through can be prevented and the image density can be further enhanced.

The ink contains a pigment.

Organic pigments such as azo pigments, phthalocyanine pigments, polycyclic pigments and dye lake pigments, and inorganic pigments such as carbon blacks and metal oxides can be used as the pigment. Examples of the azo pigments include soluble azo lake pigments, insoluble azo pigments and condensed azo pigments. Examples of the phthalocyanine pigments include metal phthalocyanine pigments and metal-free phthalocyanine pigments. Examples of the polycyclic pigments include quinacridone-based pigments, perylene-based pigments, perinone-based pigments, isoindoline-based pigments, isoindolinone-based pigments, dioxazine-based pigments, thioindigo-based pigments, anthraquinone-based pigments, quinophthalone-based pigments, metal complex pigments and diketopyrrolopyrrole (DPP). Examples of the carbon blacks include furnace carbon black, lamp black, acetylene black and channel black. Examples of the metal oxides include titanium oxide and zinc oxide. These pigments may be used individually, or a combination of two or more pigments may be used.

The dispersed form of the pigment may be a dispersion in which a so-called encapsulated pigment, in which the pigment is coated with an oil-insoluble resin, or colored resin particles are dispersed using the amide-based dispersant, but a dispersion in which the amide-based dispersant is adsorbed directly to the pigment surface is preferred.

From the viewpoints of discharge stability and storage stability, the average particle size of the pigment is preferably not more than 300 nm, more preferably not more than 200 nm, and even more preferably 150 nm or less.

The amount of the pigment is typically from 0.01 to 20% by mass of the total mass of the ink. From the viewpoint of the print density, the amount of the pigment is preferably at least 1% by mass, more preferably at least 3% by mass, and even more preferably 5% by mass or greater, relative to the total mass of the ink. On the other hand, from the viewpoint of the ink viscosity, the amount of the pigment is preferably not more than 15% by mass, and more preferably 10% by mass or less, relative to the total mass of the ink.

The ink may include an amide-based dispersant. The amide-based dispersant can disperse the pigment stably within the ink.

The amide-based dispersant is a compound that has at least one amide linkage within each molecule. The amide-based dispersant is preferably a compound that has an amide linkage portion having good pigment affinity, as well as a lipophilic group having good solvent affinity.

Examples of the amide-based dispersant include fatty acid amides and salts thereof, fatty acid alkanolamides, sulfonamides and salts thereof, and polyamide-based polymers and derivatives thereof.

At least one compound selected from the group consisting of fatty acid amides and salts thereof, and polyamide-based polymers and derivatives thereof is preferably used as the amide-based dispersant.

Examples of the fatty acid amides and salts thereof include carboxylic acid amides such as stearamide, oleamide and erucamide; ethylene bis(stearamide); and salts of these amides.

Examples of the fatty acid alkanolamides include coconut fatty acid diethanolamide, lauric acid diethanolamide, oleic acid diethanolamide, and coconut fatty acid monoethanolamide.

Examples of the polyamide-based polymers include polyamides, polyaminoamides and polyesteramides, as well as derivatives of these polymers.

Specific examples include polyamides having a comb-like structure containing a plurality of side chains each composed of a polyester chain, salts of long-chain polyaminoamides and high-molecular weight acid esters, and salts of long-chain polyaminoamides and polar acid esters.

The above amide-based dispersants may be used individually, or a combination of two or more dispersants may be used.

Of the above amide-based dispersants, a polyamide-based dispersant having a comb-like structure containing a plurality of side chains each composed of a polyester chain can be used particularly favorably. This polyamide-based dispersant is preferably a compound having a main chain containing a plurality of nitrogen atoms, such as a polyethyleneimine, and having a plurality of side chains bonded to these nitrogen atoms via amide linkages, wherein the side chains are polyester chains. Moreover, the main chain is preferably a polyethyleneimine, which may be either a straight chain or a branched chain, but is preferably a branched chain, and preferably has a weight average molecular weight of not more than 600,000. Further, the side chains are preferably poly(carbonyl-$C_3$ to $C_6$-alkyleneoxy) chains, these side chains are preferably bonded to the main chain by amide crosslinking, and the polymerization degree is preferably about 3 to 80. Examples of commercial products that correspond with these types of comb-like polyamide-based dispersants include Solsperse 11200, Solsperse 28000 and Solplus K240 (all product names), manufactured by The Lubrizol Corporation.

The amount of the amide-based dispersant need only be sufficient to enable satisfactory dispersion of the pigment within the ink, and may be set as appropriate. For example, the pigment dispersant is typically added in a mass ratio within a range from 0.1 to 5 relative to a value of 1 for the pigment. This mass ratio of the amide-based dispersant relative to a value of 1 for the pigment is preferably at least 0.2, and more preferably 0.5 or greater. Further, the mass ratio of the amide-based dispersant relative to a value of 1 for the pigment is preferably not more than 2, and more preferably 1 or less.

The amide-based dispersant may be added in an amount of 0.01 to 10% by mass relative to the total mass of the ink. The amount of the amide-based dispersant is preferably at least 1% by mass, more preferably at least 3% by mass, and may be 5% or greater, relative to the total mass of the ink. Further, the amount of the amide-based dispersant is preferably not more than 8% by mass relative to the total mass of the ink.

The amount of resin components, including the amide-based dispersant and any other pigment dispersants, is typically not more than 10% by mass, preferably not more than 7% by mass, and even more preferably not more than 5% by mass, relative to the total mass of the ink. This can prevent any increase in the ink viscosity, and further improve the discharge performance.

In one embodiment, the amide-based dispersant is preferably used in combination with an acidic or neutral pigment. This enables the amide-based dispersant to exhibit better affinity with the acidic groups on the pigment surface, and can further enhance the dispersibility.

The ink may include other pigment dispersants besides the amide-based dispersant described above.

Examples of these other pigment dispersants include hydroxyl group-containing carboxylate esters, salts of high-molecular weight polycarboxylic acids, high-molecular weight unsaturated acid esters, copolymers of vinylpyrrolidone and long-chain alkenes, modified polyurethanes, modified polyacrylates, polyether ester anionic surfactants, polyoxyethylene alkyl phosphate esters, and polyester polyamines.

Examples of commercially available pigment dispersants include Antaron V216 (a vinylpyrrolidone-hexadecene copolymer) and V220 (a vinylpyrrolidone-eicosene copolymer) (both product names), manufactured by ISP Japan Ltd.; Solsperse 13940 (a polyester amine-based dispersant), 16000, 17000 and 18000 (fatty acid amine-based dispersants), and 24000 (all product names), manufactured by The Lubrizol Corporation; Efka 400, 401, 402, 403, 450, 451 and 453 (modified polyacrylates) and Efka 46, 47, 48, 49, 4010 and 4055 (modified polyurethanes) (all product names), manufactured by BASF Japan Ltd.; Disparlon KS-860 and KS-873N4 (polyester amine salts) (both product names), manufactured by Kusumoto Chemicals, Ltd.; Discol 202, 206, OA-202 and OA-600 (multi-chain polymeric nonionic dispersants) (all product names), manufactured by DKS Co., Ltd.; DISPERBYK 2155 and 9077 (both product names), manufactured by BYK-Chemie Japan K.K.; and Hypermer KD2, KD3, KD11 and KD12 (all product names), manufactured by Croda Japan K.K.

The ink contains a modified silicone oil having 2 or 3 silicon atoms in one molecule as a non-aqueous solvent. This can improve the discharge stability of the ink from the inkjet nozzles, and particularly the discharge stability after a long idle period.

The boiling point of the modified silicone oil is preferably at least 200° C., more preferably greater than 250° C., and even more preferably 300° C. or greater. Despite having a high boiling point, the modified silicone oil has low viscosity, and because of its structure, is unlikely to adhere to the nozzle plate, thereby improving the discharge stability.

Although there are no particular limitations on the upper limit for the boiling point of the modified silicone oil, the boiling point is typically not more than 500° C.

The modified silicone is, for example, a compound having 2 or 3 silicon atoms in one molecule, and having an organic group in which a carbon atom is bonded directly to a silicon atom, and in which the total number of carbon atoms and oxygen atoms is at least 2.

A silicone oil in which any of various organic groups have been introduced on at least a portion of the silicon atoms of a dimethyl silicone oil having 2 or 3 silicon atoms in one molecule can be used as the modified silicone oil. In the modified silicone oil, it is preferable that all of the silicon atoms are bonded only to carbon atoms or siloxane linkage oxygen atoms. The modified silicone oil is preferably an unreactive silicone oil. The constituent atoms of the modified silicone oil are preferably only silicon atoms, carbon atoms, oxygen atoms and hydrogen atoms.

For example, a compound in which at least one methyl group contained in a dimethyl silicone having 2 or 3 silicon atoms in one molecule has been substituted with one or more groups selected from the group consisting of alkyl groups, carboxylate ester linkage-containing groups, aromatic ring-containing groups and ether linkage-containing groups can be used as the modified silicone oil.

Further, a compound in which a trimethylsilane or pentamethyldisiloxane is bonded to a trimethylsilane via an alkylene group can also be used as the modified silicone oil. In this case, at least one methyl group contained in the trimethylsilane and/or pentamethyldisiloxane may be substituted with one or more groups selected from the group consisting of alkyl groups, carboxylate ester linkage-containing groups, aromatic ring-containing groups and ether linkage-containing groups.

Examples of these modified silicone oils include alkyl-modified silicone oils, aryl-modified silicone oils such as phenyl-modified silicone oils and aralkyl-modified silicone oils, carboxylate ester-modified silicone oils, alkylene-modified silicone oils, and polyether-modified silicone oils.

The modified silicone oil may contain at least one group selected from the group consisting of groups (A) to (D) described below as the organic group in which the total number of carbon atoms and oxygen atoms is at least 2.

(A) Alkyl groups having at least 2 carbon atoms.

(B) Carboxylate ester linkage-containing groups in which the total number of carbon atoms and oxygen atoms is at least 3.

(C) Aromatic ring-containing groups having at least 6 carbon atoms.

(D) Alkylene groups having at least 2 carbon atoms.

For example, one or more compounds selected from the group consisting of compounds (A) to (D) described below can be used as the modified silicone oil.

(A) Compounds having an alkyl group of at least 2 carbon atoms bonded to a disiloxane skeleton or trisiloxane skeleton, hereafter also referred to as alkyl-modified silicone oils.

(B) Compounds having a carboxylate ester linkage-containing group in which the total number of carbon atoms and oxygen atoms is at least 3 bonded to a disiloxane skeleton or trisiloxane skeleton, hereafter also referred to as carboxylate ester-modified silicone oils.

(C) Compounds having an aromatic ring-containing group of at least 6 carbon atoms bonded to a disiloxane skeleton or trisiloxane skeleton, hereafter also referred to as aryl-modified silicone oils.

(D) Compounds having a silyl group or at least one siloxane linkage bonded to each of the two terminals of an alkylene group having at least 2 carbon atoms, hereafter also referred to as alkylene-modified silicone oils.

Among the above compounds, the use of one or more compounds selected from the group consisting of alkyl-modified silicone oils and carboxylate ester-modified silicone oils is preferred, and an alkyl-modified silicone oil is particularly desirable.

The total number of carbon atoms and oxygen atoms in the organic group contained in the modified silicone oil is preferably at least 2, more preferably 4 or greater, even more preferably 6 or greater, and most preferably 8 or greater.

Further, the total number of carbon atoms and oxygen atoms in the organic group contained in the modified silicone oil is preferably not more than 20, more preferably not more than 16, and even more preferably 12 or fewer.

In those cases where the modified silicone oil contains two or more organic groups, the total number of carbon atoms and oxygen atoms in each organic group preferably satisfies the above ranges.

Furthermore, when the modified silicone oil contains two or more organic groups, the total number of carbon atoms and oxygen atoms, contained within all of the organic groups each having a total number of carbon atoms and oxygen atoms of at least 2, is preferably at least 4, and more preferably 8 or greater, in one molecule. Further, when the modified silicone oil contains two or more organic groups, the total number of carbon atoms and oxygen atoms, contained within all of the organic groups each having a total number of carbon atoms and oxygen atoms of at least 2, is preferably not more than 20, and more preferably 16 or fewer, in one molecule.

Examples of the modified silicone oil include compounds represented by general formula (1) shown below.

[Chemical formula 1]

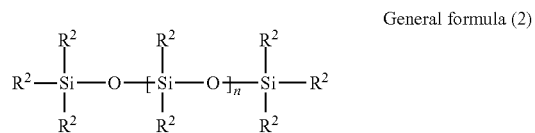

General formula (1)

In general formula (1), $R^1$ represents an oxygen atom or a divalent organic group, each $R^2$ independently represents a monovalent organic group, n represents 0 or 1, and at least one of $R^1$ and $R^2$ represents an organic group in which the total number of carbon atoms and oxygen atoms is at least 2. The number of silicon atoms in one molecule is 2 or 3.

In general formula (1), it is preferable that $R^1$ represents an oxygen atom or a divalent organic group having at least 2 carbon atoms, and each $R^2$ independently represents a methyl group or a monovalent organic group in which the total number of carbon atoms and oxygen atoms is at least 2.

In general formula (1), it is preferable that $R^1$ represents an oxygen atom or an alkylene group having at least 2 carbon atoms, each $R^2$ independently represents a methyl group, an alkyl group having at least 2 carbon atoms, a carboxylate ester linkage-containing group in which the total number of carbon atoms and oxygen atoms is at least 3, or an aromatic ring-containing group having at least 6 carbon atoms, and at least one of $R^1$ and $R^2$ is selected from the group consisting of alkylene groups having at least 2 carbon atoms, alkyl groups having at least 2 carbon atoms, carboxylate ester linkage-containing groups in which the total number of carbon atoms and oxygen atoms is at least 3, and aromatic ring-containing groups having at least 6 carbon atoms.

Other examples of the modified silicone oil include compounds represented by general formula (2) shown below.

[Chemical formula 2]

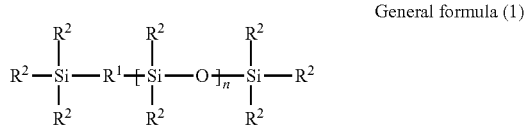

General formula (2)

In general formula (2), each $R^2$ independently represents a monovalent organic group, n represents 0 or 1, and at least one $R^2$ represents an organic group in which the total number of carbon atoms and oxygen atoms is at least 2. The number of silicon atoms in one molecule is 2 or 3.

In general formula (2), it is preferable that each $R^2$ independently represents a methyl group or an organic group in which the total number of carbon atoms and oxygen atoms is at least 2, and at least one $R^2$ represents an organic group in which the total number of carbon atoms and oxygen atoms is at least 2.

Examples of the alkyl group having at least 2 carbon atoms include an ethyl group, propyl group, isopropyl group, n-butyl group, isobutyl group, pentyl group, hexyl group, heptyl group, octyl group, isooctyl group, nonyl group, decyl group, dodecyl group, hexadecyl group and eicosyl group.

Preferred alkyl groups include an octyl group, decyl group, dodecyl group and hexadecyl group, and a decyl group or dodecyl group is particularly preferred.

For the carboxylate ester linkage-containing group in which the total number of carbon atoms and oxygen atoms is at least 3, a group represented by —$R^{Bb}$—O—(CO)—$R^{Ba}$ or a group represented by —$R^{Bb}$—(CO)—O—$R^{Ba}$, in which the carboxylate ester linkage is bonded to a silicon atom via an alkylene group, can be used particularly favorably.

Here, $R^{Ba}$ may have a straight chain or branched chain having at least 1 carbon atom, and is preferably a chain-like or alicyclic alkyl group. Further $R^{Bb}$ may have a straight chain or branched chain having at least 1 carbon atom, and is preferably a chain-like or alicyclic alkylene group.

The total number of carbon atoms and oxygen atoms in the carboxylate ester linkage-containing group is the total of the one carbon atom and two oxygen atoms in the ester linkage (—O—(CO)—), the number of carbon atoms in the alkyl group ($R^{Ba}$) of the carboxylic acid portion, and the number of carbon atoms in the optional alkylene group ($R^{Bb}$).

In the carboxylate ester linkage-containing group, examples of the alkyl group ($R^{Ba}$) of the carboxylic acid portion include a methyl group, ethyl group, propyl group, isopropyl group, n-butyl group, isobutyl group, tert-butyl group, pentyl group, hexyl group, heptyl group, octyl group, isooctyl group, nonyl group, decyl group, dodecyl group, hexadecyl group and heptadecyl group.

Preferred alkyl groups include a pentyl group, heptyl group, nonyl group and tridecyl group, and a heptyl group or nonyl group is particularly preferred.

In the carboxylate ester linkage-containing group, the optional alkylene group ($R^{Bb}$) is preferably a linear alkylene group of 1 to 8 carbon atoms, and examples include a methylene group, ethylene group, propylene group, trimethylene group, n-butylene group, isobutylene group, pentylene group, hexylene group, heptylene group, octylene group and isooctylene group. An ethylene group is preferred.

For the aromatic ring-containing group having at least 6 carbon atoms, a group represented by —$R^{Ca}$ in which the aromatic ring is bonded directly to a silicon atom, or a group represented by —$R^{Cb}$—$R^{Ca}$, in which the aromatic ring is bonded to a silicon atom via an alkylene group, can be used particularly favorably.

Here, $R^{Ca}$ is preferably an aromatic ring having at least 6 carbon atoms. Further, $R^{Cb}$ may have a straight chain or branched chain having at least 1 carbon atom, and is preferably a chain-like or alicyclic alkylene group.

The aromatic ring-containing group is preferably a group represented by —$R^{Cb}$—$R^{Ca}$ in which the aromatic ring is bonded to a silicon atom via an alkylene group.

The number of carbon atoms in the aromatic ring-containing group is the total of the number of carbon atoms in the aromatic ring ($R^{Ca}$) and the number of carbon atoms in the optional alkylene group ($R^{Cb}$).

In the aromatic ring-containing group, examples of the aromatic ring portion ($R^{Ca}$) include a phenyl group, tolyl group, xylyl group, trimethylphenyl group, biphenylyl group, naphthyl group or anthracenyl group, or a functional group in which at least one hydrogen atom of one of these groups has been substituted with an alkyl group.

In the aromatic ring-containing group, the optional alkylene group ($R^{Cb}$) is preferably an alkylene group of 1 to 8 carbon atoms that may have a straight chain or a branched chain, and examples include a methylene group, ethylene group, propylene group, trimethylene group, n-butylene group, isobutylene group, pentylene group, hexylene group, heptylene group, octylene group and isooctylene group. A propylene group, methylethylene group or ethylene group is preferred.

Examples of the alkylene group having at least 2 carbon atoms include an ethylene group, propylene group, trimethylene group, n-butylene group, isobutylene group, pentylene group, hexylene group, heptylene group, octylene group, isooctylene group, nonylene group, decylene group, dodecylene group, hexadecylene group and eicosylene group.

An octylene group, decylene group or dodecylene group is preferred, and an octylene group or decylene group is particularly desirable.

The modified silicone oils described above may be used individually, or a combination of two or more modified silicone oils may be used, provided they form a single phase.

The modified silicone oil can be produced using the method described below. However, the modified silicone oil is not restricted to silicone oils produced by the following production method.

For example, the modified silicone oil can be obtained by reacting a siloxane raw material with a reactive compound in an organic solvent. The siloxane raw material and the reactive compound are preferably reacted so that the molar ratio between one reactive group of the siloxane raw material and one reactive group of the reactive compound is within a range from 1:1 to 1:1.5. Further, during the reaction, a catalyst such as a platinum catalyst like a zero-valent platinum olefin complex, a zero-valent platinum vinylsiloxane complex, a divalent platinum olefin complex halide or platinic chloride can be used favorably.

For example, by reacting a compound of general formula (1) in which at least one $R^2$ represents a hydrogen atom as the siloxane raw material, with a reactive compound in an organic solvent, a compound represented by general formula (1) can be obtained.

Compounds having an organic group and an ethylenic unsaturated double bond can be used favorably as the reactive compound.

To obtain an alkyl-modified silicone oil, an alkene can be used as the reactive compound.

To obtain a carboxylate ester-modified silicone oil, a vinyl carboxylate compound or allyl carboxylate compound can be used as the reactive compound.

To obtain an aryl-modified silicone oil, an aryl compound having an ethylenic unsaturated double bond can be used as the reactive compound.

To obtain an alkylene-modified silicone oil, a diene compound can be used as the reactive compound.

Examples of compounds that can be used as the siloxane raw material include pentamethyldisiloxane, 1,1,3,3,-tetramethyldisiloxane, bis(trimethylsiloxy)methylsilane (1,1,1,3,5,5,5-heptamethyltrisiloxane), 1,1,3,3,5,5-hexamethyltetrasiloxane, 1,1,1,5,5,5-hexamethyltrisiloxane, and trimethylsilane.

Examples of alkenes that may be used include ethylene, propylene, 1-butene, 2-butene, 1-pentene, 1-hexene, 1-heptene, 1-octene, 2-octene, 1-nonene, 1-decene, 1-dodecene, 1-hexadecene and 1-eicosene. Further, besides alkenes, alicyclic hydrocarbons having an ethylenic unsaturated double bond such as vinylcyclohexane can also be used.

Examples of vinyl carboxylate compounds and allyl carboxylate compounds that may be used include vinyl acetate, vinyl propionate, vinyl butyrate, vinyl isobutanoate, vinyl pentanoate, vinyl pivalate, vinyl hexanoate, vinyl heptanoate, vinyl 2-ethylhexanoate, vinyl octanoate, vinyl isooctanoate, vinyl nonanoate, vinyl decanoate, vinyl laurate, vinyl myristate, vinyl palmitate, vinyl eicosanoate, and allyl hexanoate.

Examples of aryl compounds having an ethylenic unsaturated double bond that may be used include styrene, 4-methylstyrene, 2-methylstyrene, 4-tert-butylstyrene, allylbenzene, 1-allylnaphthalene, 4-phenyl-1-butene, 2,4-diphenyl-4-methyl-1-pentene, 1-vinylnaphthalene, α-methylstyrene, 2-methyl-1-phenylpropene, 1,1-diphenylethylene, triphenylethylene, 2,4,6-trimethylstyrene, cis-β-methylstyrene, and trans-β-methylstyrene.

Examples of diene compounds that may be used include 1,3-butadiene, 1,3-pentadiene, 1,4-pentadiene, 1,5-hexadiene, 1,6-heptadiene, 1,7-octadiene, 1,8-nonadiene, 1,9-decadiene, 1,11-dodecadiene, 1,10-undecadiene, 1,13-tetradecadiene, hexadecadiene, and eicosadiene.

Commercially available products may be used as the silicone oil, and examples of products that may be used include alkyl-modified silicone oils such as "FZ-3196" manufactured by Dow Corning Toray Co., Ltd., and aryl-modified silicone oils such as "1,1,1,5,5,5-hexamethyl-3-phenyl-3-(trimethylsilyloxy)trisiloxane" manufactured by Tokyo Chemical Industry Co., Ltd.

The ink also contains a petroleum-based hydrocarbon solvent as a non-aqueous solvent. This enhances the affinity with the pigment and the amide-based dispersant, and can improve the image density of the printed items, as well as preventing show-through.

The initial boiling point of the petroleum-based hydrocarbon solvent is preferably not more than 300° C., more preferably not more than 280° C., and even more preferably 250° C. or lower. This facilitates dissolution of the amide-based dispersant in the petroleum-based hydrocarbon solvent, and ensures that on the recording medium, the modified silicone oil penetrates into the interior of the recording medium, whereas the petroleum-based hydrocarbon solvent is retained at the recording medium surface together with the amide-based dispersant and the pigment.

From the viewpoint of preventing volatilization of the solvent from the nozzles, the lower limit for the initial boiling point of the petroleum-based hydrocarbon solvent is preferably at least 150° C.

The initial boiling point can be measured in accordance with JIS K0066 "Test Methods for Distillation of Chemical Products".

The aniline point of the petroleum-based hydrocarbon solvent is preferably not more than 110° C., more preferably not more than 100° C., and even more preferably 90° C. or lower. This facilitates dissolution of the amide-based dispersant in the petroleum-based hydrocarbon solvent, which enables the amide-based dispersant to coat the pigment surface more uniformly, and can improve the pigment dispersibility.

Although there are no particular limitations on the lower limit for the aniline point for the petroleum-based hydrocarbon solvent, a value of at least 50° C. is preferred.

The aniline point can be measured in accordance with JIS K2256 "Petroleum Products—Determination Of Aniline Point And Mixed Aniline Point".

Examples of solvents that can be used favorably as the petroleum-based hydrocarbon solvent include petroleum-based hydrocarbon solvents such as aliphatic hydrocarbon solvents, alicyclic hydrocarbon solvents and aromatic hydrocarbon solvents.

Examples of the aliphatic hydrocarbon solvents and alicyclic hydrocarbon solvents include paraffin-based, isoparaffin-based, and naphthene-based non-aqueous solvents. Specific examples of preferred commercially available products include No. 0 Solvent L, No. 0 Solvent M, No. 0 Solvent H, Cactus Normal Paraffin N-10, Cactus Normal Paraffin N-11, Cactus Normal Paraffin N-12, Cactus Normal Paraffin N-13, Cactus Normal Paraffin N-14, Cactus Normal Paraffin N-15H, Cactus Normal Paraffin YHNP, Cactus Normal Paraffin SHNP, Isosol 300, Isosol 400, Teclean N-16, Teclean N-20, Teclean N-22, AF Solvent No. 4, AF Solvent No. 5, AF Solvent No. 6, AF Solvent No. 7, Naphtesol 160, Naphtesol 200 and Naphtesol 220 (all manufactured by JXTG Nippon Oil & Energy Corporation); Isopar C, Isopar G, Isopar H, Isopar L, Isopar M, Exxsol D30, Exxsol D40, Exxsol D60, Exxsol D80, Exxsol D95, Exxsol D110 and Exxsol D130 (all manufactured by Exxon Mobil Corporation); and MORESCO White P-40, MORESCO White P-60, MORESCO White P-70, MORESCO White P-80, MORESCO White P-100, MORESCO White P-120, MORESCO White P-150, MORESCO White P-200, MORESCO White P-260 and MORESCO White P-350P (all manufactured by MORESCO Corporation).

Examples of preferred aromatic hydrocarbon solvents include Grade Alkene L and Grade Alkene 200P (both manufactured by JXTG Nippon Oil & Energy Corporation), and Solvesso 100, Solvesso 150, Solvesso 200 and Solvesso 200ND (all manufactured by Exxon Mobil Corporation).

These petroleum-based hydrocarbon solvents may be used individually, or a combination of two or more solvents may be used, provided the solvents form a single phase.

Among these solvents, paraffin-based solvents, isoparaffin-based solvents and naphthene-based solvents can be used particularly favorably.

The ink may also contain other non-aqueous solvents. In the embodiments, a water-insoluble organic solvent that does not mix uniformly with an equal volume of water at 1 atmosphere and 20° C. is preferably used as this other non-aqueous solvent.

Examples of these other non-aqueous solvents include polar organic solvents such as fatty acid ester-based solvents, higher alcohol-based solvents and higher fatty acid-based solvents.

Specific examples include fatty acid ester-based solvents having at least 13 carbon atoms, and preferably 16 to 30 carbon atoms, within one molecule, such as isononyl isononanoate, isodecyl isononanoate, isotridecyl isononanoate (22 carbon atoms), methyl laurate, isopropyl laurate, hexyl laurate, isopropyl myristate, isopropyl palmitate, hexyl palmitate, isooctyl palmitate, isostearyl palmitate, methyl oleate, ethyl oleate, isopropyl oleate, butyl oleate, hexyl oleate, methyl linoleate, ethyl linoleate, isobutyl linoleate, butyl stearate, hexyl stearate, isooctyl stearate, isopropyl isostearate, 2-octyldecyl pivalate, methyl soybean oil, isobutyl soybean oil, methyl tallate and isobutyl tallate; higher alcohol-based solvents having at least 6 carbon atoms, and preferably 12 to 20 carbon atoms, within one molecule, such as isomyristyl alcohol, isopalmityl alcohol, isostearyl alcohol, oleyl alcohol, isoeicosyl alcohol and decyltetradecanol; and higher fatty acid-based solvents having at least 12 carbon atoms, and preferably 14 to 20 carbon atoms, within one molecule, such as lauric acid, isomyristic acid, palmitic acid, isopalmitic acid, α-linolenic acid, linoleic acid, oleic acid and isostearic acid.

These non-aqueous solvents may be used individually, or a combination of two or more solvents may be used, provided the solvents form a single phase.

The boiling point of these polar organic solvents such as the fatty acid ester-based solvents, higher alcohol-based solvents and higher fatty acid-based solvents is preferably at least 150° C., more preferably at least 200° C., and even more preferably 250° C. or higher. These non-aqueous solvents having a boiling point of 250° C. or higher also include non-aqueous solvents that do not exhibit an actual boiling point.

The amount of the modified silicone oil, relative to the total mass of the non-aqueous solvent, is preferably at least 5% by mass, more preferably at least 15% by mass, even more preferably at least 25% by mass, and may be 50% by mass or greater. This enables the discharge stability to be improved.

Further, the amount of the modified silicone oil, relative to the total mass of the non-aqueous solvent, is preferably not more than 95% by mass, more preferably not more than 85% by mass, even more preferably not more than 75% by mass, and may be 50% by mass or less.

The amount of the petroleum-based hydrocarbon solvent, relative to the total mass of the non-aqueous solvent, is preferably at least 5% by mass, more preferably at least 15% by mass, even more preferably at least 25% by mass, and may be 50% by mass or greater. This enables show-through in the printed items to be better prevented.

Further, the amount of the petroleum-based hydrocarbon solvent, relative to the total mass of the non-aqueous solvent, is preferably not more than 95% by mass, more preferably not more than 85% by mass, even more preferably not more than 75% by mass, and may be 50% by mass or less.

From the viewpoint of the discharge stability and the level of show-through in the printed items, the amount of the modified silicone oil is preferably from 15% by mass to 85% by mass relative to the total mass of the non-aqueous solvent.

Further, from the viewpoint of the discharge stability and the level of show-through in the printed items, the amount of the petroleum-based hydrocarbon solvent is preferably from 15% by mass to 85% by mass relative to the total mass of the non-aqueous solvent.

The modified silicone oil and the petroleum-based hydrocarbon solvent are added in a mass ratio that is preferably within a range from 20:80 to 80:20, and more preferably from 30:70 to 70:30.

The amount of the modified silicone oil relative to the total mass of the ink varies depending on the total amount of the non-aqueous solvent used, but is typically from 5 to 95% by mass, and may be from 10 to 90% by mass.

The amount of the petroleum-based hydrocarbon solvent relative to the total mass of the ink varies depending on the total amount of the non-aqueous solvent used, but is typically from 5 to 95% by mass, and may be from 10 to 90% by mass.

In addition to the various components described above, the oil-based ink may also include various additives, provided these additives do not impair the effects of the present invention. For example, additives such as nozzle blockage inhibitors, antioxidants, conductivity modifiers, viscosity modifiers, surface tension regulators, and oxygen absorbers and the like may be added as appropriate. Further, a dye may also be used in combination with the pigment to adjust the color tone. There are no particular limitations on these additives, and materials typically used in this technical field may be used.

The ink can be produced by mixing the various components including the colorant and the non-aqueous solvent. The ink is preferably produced by mixing and stirring the components together, either in a single batch or in a number of separate batches. Specifically, the ink can be produced by dispersing all of the components in a dispersion device such as a beads mill, either in a single batch or in a number of separate batches, and then, if desired, passing the resulting dispersion through a filtration device such as a membrane filter.

The ideal range for the viscosity of the oil-based inkjet ink varies depending on factors such as the diameter of the nozzles within the discharge head of the inkjet recording system and the discharge environment, but generally, the viscosity at 23° C. is preferably within a range from 5 to 30 mPa·s, more preferably from 5 to 15 mPa·s, and most preferably about 10 mPa·s.

There are no particular limitations on the printing method used with the inkjet ink, and any of various printing systems, including a piezo system, electrostatic system or thermal system may be used, but a piezo system is preferred. In those cases where an inkjet recording device is used, the ink of the embodiments is preferably discharged from the inkjet head based on a digital signal, with the discharged ink droplets being adhered to a recording medium.

In the embodiments, there are no particular limitations on the recording medium, and examples of media that can be used include printing papers such as plain papers, coated papers and specialty papers, cloth, inorganic sheets, films and OHP sheets, and adhesive sheets having one of the above media as a base material and having an adhesive layer provided on the rear surface. Among these, from the viewpoint of ink penetration, a printing paper such as a plain paper or a coated paper can be used particularly favorably.

Here, plain paper describes a normal paper in which an ink receiving layer or film layer or the like has not been formed on the surface of the paper. Examples of plain papers include high-quality papers, medium-quality papers, PPC papers, woody papers and recycled papers. In a plain paper, paper fibers with a thickness of several μm to several tens of μm are formed with a spacing between fibers of several tens to several hundred μm, and therefore the ink can penetrate readily.

Further, in terms of coated papers, coated papers designed for inkjets, such as matte papers, glossy papers and semi-glossy papers, and other so-called coated printing papers can be used favorably. A coated printing paper describes the type of paper that has conventionally been used in relief printing, offset printing, and gravure printing and the like, and is a printing paper in which a coating layer is formed on the surface of a high-quality paper or medium-quality paper using a coating material containing an inorganic pigment such as clay or calcium carbonate and a binder such as starch. Depending on the amount applied of the coating material and the coating method used, coated printing papers are classified into fine coated papers, high-quality lightweight coated papers, medium-quality lightweight coated papers, high-quality coated papers, medium-quality coated papers, art papers, and cast coated papers and the like.

EXAMPLES

The present invention is described below in further detail using a series of examples. The present invention is in no way limited by the following examples.

[Preparation of Inks]

Ink formulations are shown in Table 1 and Table 2.

The pigments, pigment dispersants, and the various solvents shown in each of the tables were mixed together in accordance with the amounts shown in each table, and the pigment was dispersed thoroughly using a beads mill (Dyno-Mill KDL-A, manufactured by Shinmaru Enterprises Corporation) under conditions including a residence time of 15 minutes. Subsequently, coarse particles were removed with a membrane filter to obtain the ink.

The pigments and dispersants were as follows.

Carbon black MA77: manufactured by Mitsubishi Chemical Corporation.

Carbon black NEROX500: manufactured by Evonik Japan Co., Ltd.

Solplus K240: an amide-based dispersant, manufactured by The Lubrizol Corporation, effective component: 100%.

Solsperse 28000: an amide-based dispersant, manufactured by The Lubrizol Corporation, effective component: 100%.

Solsperse 13940: a polyester amine-based dispersant, manufactured by The Lubrizol Corporation, effective component: 40% (aliphatic solvent: 60%), the amount of the effective component is shown in parentheses in the tables.

Details relating to the various solvents are listed in Table 3.

TABLE 1

| | Ink formulations and evaluation results | | | | | |
|---|---|---|---|---|---|---|
| | Units: % by mass | Example 1 | Example 2 | Example 3 | Example 4 | Example 5 |
| Pigments | Carbon black MA77 | 5.00 | 5.00 | 5.00 | 5.00 | 5.00 |
| | Carbon black NEROX500 | — | — | — | — | — |
| Amide-based dispersants | Solplus K240 | 5.00 | 5.00 | 5.00 | 5.00 | 5.00 |
| | Solsperse 28000 | — | — | — | — | — |
| Polyester amine-based dispersant | Solsperse 13940 (effective component: 40%) | — | — | — | — | — |
| Silicone oils | Silicone oil 1 (C6 alkyl-modified trisiloxane) | 45.00 | — | — | — | — |
| | Silicone oil 2 (C8 alkyl-modified trisiloxane) | — | 45.00 | — | — | — |
| | Silicone oil 3 (C12 alkyl-modified trisiloxane) | — | — | 45.00 | — | — |
| | Silicone oil 4 (C + O = 11 ester-modified trisiloxane) | — | — | — | 45.00 | — |
| | Silicone oil 5 (C12 alkyl-modified disiloxane) | — | — | — | — | 45.00 |
| | Silicone oil 6 (C12 alkyl-modified pentasiloxane) | — | — | — | — | — |
| | KF96L-5CS Dimethyl silicone | — | — | — | — | — |
| Paraffin-based solvents | Isopar C | — | — | — | — | — |
| | Isopar H | 45.00 | 45.00 | 45.00 | 45.00 | 45.00 |
| | Isopar M | — | — | — | — | — |
| Naphthene-based solvents | Exxsol D30 | — | — | — | — | — |
| | Exxsol D80 | — | — | — | — | — |
| | Exxsol D130 | — | — | — | — | — |
| Ester-based solvent | Isotridecyl isononanoate | — | — | — | — | — |
| Total (% by mass) | | 100.00 | 100.00 | 100.00 | 100.00 | 100.00 |
| Silicone oil boiling point (° C.) | | <250 | 250< | 250< | 250< | 250< |
| Petroleum-based hydrocarbon solvent initial boiling point (° C.) | | 180 | 180 | 180 | 180 | 180 |
| Petroleum-based hydrocarbon solvent aniline point (° C.) | | 85 | 85 | 85 | 85 | 85 |
| Ester-based solvent boiling point (° C.) | | — | — | — | — | — |
| Amount of silicone oil in total solvent (% by mass) | | 50.00 | 50.00 | 50.00 | 50.00 | 50.00 |
| Amount of petroleum-based hydrocarbon solvent in total solvent (% by mass) | | 50.00 | 50.00 | 50.00 | 50.00 | 50.00 |
| Discharge stability after long idle period | | B | A | A | A | A |
| Surface density | | A | A | A | A | A |
| Show-through | | A | A | A | B | A |

| | Units: % by mass | Example 6 | Example 7 | Example 8 | Example 9 | Example 10 |
|---|---|---|---|---|---|---|
| Pigments | Carbon black MA77 | 5.00 | 5.00 | 5.00 | 5.00 | 5.00 |
| | Carbon black NEROX500 | — | — | — | — | — |
| Amide-based dispersants | Solplus K240 | 5.00 | 5.00 | 5.00 | 5.00 | 5.00 |
| | Solsperse 28000 | — | — | — | — | — |
| Polyester amine-based dispersant | Solsperse 13940 (effective component: 40%) | — | — | — | — | — |
| Silicone oils | Silicone oil 1 (C6 alkyl-modified trisiloxane) | — | — | — | — | — |
| | Silicone oil 2 (C8 alkyl-modified trisiloxane) | 45.00 | 45.00 | 45.00 | 45.00 | 45.00 |
| | Silicone oil 3 (C12 alkyl-modified trisiloxane) | — | — | — | — | — |
| | Silicone oil 4 (C + O = 11 ester-modified trisiloxane) | — | — | — | — | — |
| | Silicone oil 5 (C12 alkyl-modified disiloxane) | — | — | — | — | — |
| | Silicone oil 6 (C12 alkyl-modified pentasiloxane) | — | — | — | — | — |
| | KF96L-5CS Dimethyl silicone | — | — | — | — | — |
| Paraffin-based solvents | Isopar C | 45.00 | — | — | — | — |
| | Isopar H | — | — | — | — | — |
| | Isopar M | — | 45.00 | — | — | — |

TABLE 1-continued

Ink formulations and evaluation results

|  |  |  |  |  |  |  |
|---|---|---|---|---|---|---|
| Naphthene-based solvents | Exxsol D30 | — | — | 45.00 | — | — |
|  | Exxsol D80 | — | — | — | 45.00 | — |
|  | Exxsol D130 | — | — | — | — | 45.00 |
| Ester-based solvent | Isotridecyl isononanoate | — | — | — | — | — |
| Total (% by mass) |  | 100.00 | 101.00 | 100.00 | 100.00 | 100.00 |
| Silicone oil boiling point (° C.) |  | 250< | 250< | 250< | 250< | 250< |
| Petroleum-based hydrocarbon solvent initial boiling point (° C.) |  | 98 | 224 | 145 | 205 | 279 |
| Petroleum-based hydrocarbon solvent aniline point (° C.) |  | 78 | 91 | 65 | 76 | 88 |
| Ester-based solvent boiling point (° C.) |  | — | — | — | — | — |
| Amount of silicone oil in total solvent (% by mass) |  | 50.00 | 50.00 | 50.00 | 50.00 | 50.00 |
| Amount of petroleum-based hydrocarbon solvent in total solvent (% by mass) |  | 50.00 | 50.00 | 50.00 | 50.00 | 50.00 |
| Discharge stability after long idle period |  | A | A | A | A | A |
| Surface density |  | A | B | A | A | A |
| Show-through |  | A | B | A | A | B |

TABLE 2

Ink formulations and evaluation results

|  | Units: % by mass | Example 11 | Example 12 | Example 13 | Example 14 | Example 15 |
|---|---|---|---|---|---|---|
| Pigments | Carbon black MA77 | 5.00 | — | 5.00 | 5.00 | 5.00 |
|  | Carbon black NEROX500 | — | 5.00 | — | — | — |
| Amide-based dispersants | Solplus K240 | — | 5.00 | 5.00 | 5.00 | 5.00 |
|  | Solsperse 28000 | 5.00 | — | — | — | — |
| Polyester amine-based dispersant | Solsperse 13940 (effective component: 40%) | — | — | — | — | — |
| Silicone oils | Silicone oil 1 (C6 alkyl-modified trisiloxane) | — | — | — | — | — |
|  | Silicone oil 2 (C8 alkyl-modified trisiloxane) | 45.00 | 45.00 | 20.00 | 70.00 | 35.00 |
|  | Silicone oil 3 (C12 alkyl-modified trisiloxane) | — | — | — | — | — |
|  | Silicone oil 4 (C + O = 11 ester-modified trisiloxane) | — | — | — | — | — |
|  | Silicone oil 5 (C12 alkyl-modified disiloxane) | — | — | — | — | — |
|  | Silicone oil 6 (C12 alkyl-modified pentasiloxane) | — | — | — | — | — |
|  | KF96L-5CS Dimethyl silicone | — | — | — | — | — |
| Paraffin-based solvents | Isopar C | — | — | — | — | — |
|  | Isopar H | 45.00 | 45.00 | 70.00 | 20.00 | 35.00 |
|  | Isopar M | — | — | — | — | — |
| Naphthene-based solvents | Exxsol D30 | — | — | — | — | — |
|  | Exxsol D80 | — | — | — | — | — |
|  | Exxsol D130 | — | — | — | — | — |
| Ester-based solvent | Isotridecyl isononanoate | — | — | — | — | 20.00 |
| Total (% by mass) |  | 100.00 | 100.00 | 100.00 | 100.00 | 100.00 |
| Silicone oil boiling point (° C.) |  | 250< | 250< | 250< | 250< | 250< |
| Petroleum-based hydrocarbon solvent initial boiling point (° C.) |  | 180 | 180 | 180 | 180 | 180 |
| Petroleum-based hydrocarbon solvent aniline point (° C.) |  | 85 | 85 | 85 | 85 | 85 |
| Ester-based solvent boiling point (° C.) |  | — | — | — | — | 250< |
| Amount of silicone oil in total solvent (% by mass) |  | 50.00 | 50.00 | 22.22 | 77.78 | 38.89 |
| Amount of petroleum-based hydrocarbon solvent in total solvent (% by mass) |  | 50.00 | 50.00 | 77.78 | 22.22 | 38.89 |
| Discharge stability after long idle period |  | A | A | B | A | A |
| Surface density |  | A | A | A | A | A |
| Show-through |  | A | A | A | B | A |

|  | Units: % by mass | Comparative Example 1 | Comparative Example 2 | Comparative Example 3 | Comparative Example 4 | Comparative Example 5 |
|---|---|---|---|---|---|---|
| Pigments | Carbon black MA77 | 5.00 | 5.00 | 5.00 | 5.00 | 5.00 |
|  | Carbon black NEROX500 | — | — | — | — | — |
| Amide-based dispersants | Solplus K240 | 5.00 | 5.00 | — | 5.00 | 5.00 |
|  | Solsperse 28000 | — | — | — | — | — |
| Polyester | Solsperse 13940 | — | — | 12.50 | — | — |

TABLE 2-continued

Ink formulations and evaluation results

|  |  |  |  |  |  |  |
|---|---|---|---|---|---|---|
| amine-based dispersant | (effective component: 40%) |  |  |  | (5.00) |  |
| Silicone oils | Silicone oil 1 (C6 alkyl-modified trisiloxane) | — | — | — | — | — |
|  | Silicone oil 2 (C8 alkyl-modified trisiloxane) | — | — | 45.00 | 90.00 | — |
|  | Silicone oil 3 (C12 alkyl-modified trisiloxane) | — | — | — | — | — |
|  | Silicone oil 4 (C + O = 11 ester-modified trisiloxane) | — | — | — | — | — |
|  | Silicone oil 5 (C12 alkyl-modified disiloxane) | — | — | — | — | — |
|  | Silicone oil 6 (C12 alkyl-modified pentasiloxane) | 45.00 | — | — | — | — |
|  | KF96L-5CS Dimethyl silicone | — | 45.00 | — | — | — |
| Paraffin-based solvents | Isopar C | — | — | — | — | — |
|  | Isopar H | 45.00 | 45.00 | 37.50 | — | 90.00 |
|  | Isopar M | — | — | — | — | — |
| Naphthene-based solvents | Exxsol D30 | — | — | — | — | — |
|  | Exxsol D80 | — | — | — | — | — |
|  | Exxsol D130 | — | — | — | — | — |
| Ester-based solvent | Isotridecyl isononanoate | — | — | — | — | — |
| Total (% by mass) |  | 100.00 | 100.00 | 100.00 | 100.00 | 100.00 |
| Silicone oil boiling point (° C.) |  | — | — | 250< | 250< | — |
| Petroleum-based hydrocarbon solvent initial boiling point (° C.) |  | 180 | 180 | 180 | — | 180 |
| Petroleum-based hydrocarbon solvent aniline point (° C.) |  | 85 | 85 | 85 | — | 85 |
| Ester-based solvent boiling point (° C.) |  | — | — | — | — | — |
| Amount of silicone oil in total solvent (% by mass) |  | 50.00 | 50.00 | 50.00 | 100.00 | 0.00 |
| Amount of petroleum-based hydrocarbon solvent in total solvent (% by mass) |  | 50.00 | 50.00 | 50.00 | 0.00 | 100.00 |
| Discharge stability after long idle period |  | C | C | A | A | C |
| Surface density |  | A | A | C | C | A |
| Show-through |  | A | A | A | C | C |

TABLE 3

Solvent details

|  |  | Boiling point (° C.) | Initial boiling point (° C.) | Aniline point (° C.) | Manufacturer/ product name |
|---|---|---|---|---|---|
| Silicone oils | Silicone oil 1 (C6 alkyl-modified trisiloxane) | <250 | — | — | Production Example 1 |
|  | Silicone oil 2 (C8 alkyl-modified trisiloxane) | 250< | — | — | Production Example 1 |
|  | Silicone oil 3 (C12 alkyl-modified trisiloxane) | 250< | — | — | Production Example 1 |
|  | Silicone oil 4 (C + O = 11 ester-modified trisiloxane) | 250< | — | — | Production Example 1 |
|  | Silicone oil 5 (C12 alkyl-modified disiloxane) | 250< | — | — | Production Example 1 |
|  | Silicone oil 6 (C12 alkyl-modified pentasiloxane) | 250< | — | — | Production Example 1 |
|  | KF96L-5CS Dimethyl silicone | 250< | — | — | Shin-Etsu Chemical Co., Ltd. KF96L-5CS |
| Paraffin-based solvents | Isopar C | — | 98 | 78 | Exxon Mobil Corporation |
|  | Isopar H | — | 180 | 85 | Exxon Mobil Corporation |
|  | Isopar M | — | 224 | 91 | Exxon Mobil Corporation |
| Naphthene-based solvents | Exxsol D30 | — | 145 | 65 | Exxon Mobil Corporation |
|  | Exxsol D80 | — | 205 | 76 | Exxon Mobil Corporation |

TABLE 3-continued

| | | Boiling point (° C.) | Initial boiling point (° C.) | Aniline point (° C.) | Manufacturer/ product name |
|---|---|---|---|---|---|
| | Exxsol D130 | — | 279 | 88 | Exxon Mobil Corporation |
| Ester-based solvent | Isotridecyl isononanoate | 250< | — | — | Kokyu Alcohol Kogyo Co., Ltd. KAK139 |

Production Example 1: Synthesis of Silicone Oils

Synthetic Formulations of Silicone Oils are Shown in Table 4.

For each silicone oil, the number of silicon atoms (Si number), and the total number of carbon atoms (C number) and oxygen atoms (O number) in the organic group are also shown in the table.

TABLE 4

Synthetic formulations of silicone oils

| | Siloxane compound (parts by mass) | | Reactive compound (parts by mass) | | Si number | Total of C number and O number for organic group |
|---|---|---|---|---|---|---|
| | Compound name | Amount | Compound name | Amount | | |
| Silicone oil 1 (C6 alkyl-modified trisiloxane) | 1,1,1,3,5,5,5-heptamethyltrisiloxane | 10.0 | 1-hexene | 4.2 | 3 | 6 |
| Silicone oil 2 (C8 alkyl-modified trisiloxane) | 1,1,1,3,5,5,5-heptamethyltrisiloxane | 10.0 | 1-octene | 5.6 | 3 | 8 |
| Silicone oil 3 (C12 alkyl-modified trisiloxane) | 1,1,1,3,5,5,5-heptamethyltrisiloxane | 10.0 | 1-dodecene | 8.3 | 3 | 12 |
| Silicone oil 4 (C + O = 11 ester-modified trisiloxane) | 1,1,1,3,5,5,5-heptamethyltrisiloxane | 10.0 | allyl hexanoate | 7.7 | 3 | 11 C: 9 O: 2 |
| Silicone oil 5 (C12 alkyl-modified disiloxane) | 1,1,1,3,3-pentamethyldisiloxane | 10.0 | 1-dodecene | 12.5 | 2 | 12 |
| Silicone oil 6 (C12 alkyl-modified pentasiloxane) | 1,1,3,3,5,5,7,7,9,9-decamethylpentasiloxane | 10.0 | 1-hexene | 5.0 | 5 | 12 2 × C6 |

The method used for synthesizing the silicone oil 1 is described below.

A four-necked flask was charged with 50 parts by mass of hexane, 10.0 parts by mass of 1,1,1,3,5,5,5-heptamethyltrisiloxane, and 4.16 parts by mass of 1-hexene. Subsequently, 0.02 parts by mass of a platinum catalyst (1,3-divinyl-1,1,3,3-tetramethyldisiloxane platinum complex, manufactured by Sigma-Aldrich Corporation) was added dropwise to the flask, and the resulting mixture was stirred at room temperature for 2 to 3 hours. The reaction solvent (hexane) and any unreacted raw materials were then removed by distillation under reduced pressure to obtain the target product.

The other modified silicone oils were synthesized in a similar manner, but with the exception of using the formulations shown in the table.

In the syntheses of the silicone oils 1 to 5, the siloxane compound and the reactive compound were combined in a mass ratio of 1:1.1, whereas in the synthesis of the silicone oil 6, the siloxane compound and the reactive compound were combined in a mass ratio of 1:2.2.

The siloxane compounds can be obtained from Gelest, Inc., and the reactive compounds can be obtained from Tokyo Chemical Industry Co., Ltd.

[Evaluations]

The inks from the examples and comparative examples described above were evaluated using the methods described below. The evaluation results are shown in Table 1 and Table 2.

(Discharge Stability after Long Idle Period)

Each ink was introduced into an inkjet head, a solid image (30 pl per pixel, 300×300 dpi) was printed onto a plain paper "RISO Paper Thin Type" (manufactured by RISO KAGAKU CORPORATION), and the discharge was confirmed as being normal.

Subsequently, the inkjet head was left idle at room temperature for 3 months. After standing idle for 3 months, the inkjet head was installed in a line-type inkjet printer "ORPHIS FW5230" (manufactured by RISO KAGAKU CORPORATION), a cleaning operation was performed, 500 sheets of a solid image were printed (30 pl per pixel, 300×300 dpi), and a determination was made as to whether or not white lines (discharge faults) were present in the image.

In the cleaning operation, the path for supplying the ink to the inkjet head was pressurized to force the ink from the discharge ports of the inkjet head (so-called purging), and the inkjet head surface was then wiped with a wiper.

The ORPHIS FW5230 is a system that uses a line-type inkjet head, wherein the paper is transported in a sub-scanning direction perpendicular to the main scanning direction (the direction along which the nozzles are aligned) while printing is conducted.

The discharge stability after the idle period was evaluated against the following criteria.

A: Of the 500 sheets, white lines occurred on 5 sheets or less

B: Of the 500 sheets, white lines occurred on at least 6 but not more than 10 sheets C: Of the 500 sheets, white lines occurred on at least 11 sheets (Surface Density and Show-Through of Printed Items)

Each of the inks described above was mounted in the line-type inkjet printer "ORPHIS—FW5230" (manufactured by RISO KAGAKU CORPORATION), and printed items were obtained by printing 100 copies of a solid image onto a plain paper "RISO Paper Thin Type" (manufactured by RISO KAGAKU CORPORATION). The printing was performed at a resolution of 300×300 dpi, under discharge conditions including an ink volume per dot of 42 pl.

After standing for one day following printing, the density (surface OD value) of the solid image portion of the printed surface was measured, and the surface density was evaluated against the following criteria.

A: surface OD value of 1.10 or greater
B: surface OD value of at least 1.05 but less than 1.10
C: surface OD value of less than 1.05

After standing for one day following printing, the density within the solid image portion on the rear surface of the printed item (namely, the rear surface OD value) was measured, and the show-through was evaluated against the following criteria.

A: rear surface OD value of less than 0.15
B: rear surface OD value of at least 0.15 but less than 0.20
C: rear surface OD value of at least 0.20

As shown in the tables, the inks of the Examples each exhibited improved discharge stability after standing idle, and were able to produce high surface density and prevent show-through on the printed items.

Examples 1 to 5 confirmed the effects for each of the silicone oils.

The results of Examples 1 to 5 confirmed that the higher the boiling point of the silicone oil, the more the discharge stability after standing idle improved, and that show-through could be better prevented by using an alkyl-modified silicone oil.

Examples 6 to 10 confirmed the effects for each of the various petroleum-based hydrocarbon solvents.

The results of Examples 6 to 10 confirmed that the lower the initial boiling point of the petroleum-based hydrocarbon solvent, the better show-through was able to be prevented, and that the lower the aniline point of the petroleum-based hydrocarbon solvent, the higher the surface density of the printed item became.

In Examples 11 and 12, the pigment and pigment dispersant were changed, but satisfactory effects were still obtained.

In Examples 13 and 14, the blend ratio between the silicone oil and the petroleum-based hydrocarbon solvent was altered, but satisfactory effects were still obtained.

In Example 15, an ester-based solvent was also used in combination with the silicone oil and the petroleum-based hydrocarbon solvent, but satisfactory effects were still obtained.

In Comparative Example 1, the silicone oil had a large silicon number of 5, and the discharge stability after standing idle deteriorated.

In Comparative Example 2, an unmodified dimethylpolysiloxane having a large silicon number of 7 to 9 was used as the silicone oil, and the discharge stability after standing idle deteriorated.

In Comparative Example 3, a polyester amine-based dispersant was used, and the surface density of the printed items deteriorated.

In Comparative Example 4, a petroleum-based hydrocarbon solvent was not used, and the surface density and show-through of the printed items could not be improved.

In Comparative Example 5, a silicone oil was not used, and the discharge stability after standing idle deteriorated. Further, when the solvent was a single phase composed of a petroleum-based hydrocarbon solvent, penetration of the solvent into the paper was accelerated, meaning the level of show-through could not be improved.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An oil-based inkjet ink comprising a pigment, an amide-based dispersant and a nonaqueous solvent, wherein the non-aqueous solvent comprises a modified silicone oil having 2 or 3 silicon atoms in one molecule, and a petroleum-based hydrocarbon solvent.

2. The oil-based inkjet ink according to claim 1, wherein a boiling point of the modified silicone oil is higher than 250° C., and an initial boiling point of the petroleum-based hydrocarbon solvent is 250° C. or lower.

3. The oil-based inkjet ink according to claim 1, wherein an aniline point of the petroleum-based hydrocarbon solvent is 90° C. or lower.

4. The oil-based inkjet ink according to claim 1, wherein the modified silicone oil contains a modified silicone oil having an organic group in which a carbon atom is bonded to a silicon atom and in which a total number of carbon atoms and oxygen atoms is at least 4.

5. The oil-based inkjet ink according to a claim 1, wherein the modified silicone oil contains an alkyl-modified silicone oil.

* * * * *

UNITED STATES PATENT AND TRADEMARK OFFICE
CERTIFICATE OF CORRECTION

PATENT NO. : 10,865,322 B2
APPLICATION NO. : 15/904508
DATED : December 15, 2020
INVENTOR(S) : H. Sugiura et al.

Page 1 of 1

It is certified that error appears in the above-identified patent and that said Letters Patent is hereby corrected as shown below:

In the Claims

Column 24, Line 54 (Claim 5) please change "to a claim" to -- to claim --.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*